United States Patent [19]

Suzuki et al.

[11] 4,418,298
[45] Nov. 29, 1983

[54] MOTOR SPEED CONTROL CIRCUIT

[75] Inventors: Hitoshi Suzuki; Fusao Makino, both of Nara, Japan

[73] Assignee: Sharp Kabushiki Kaisha, Osaka, Japan

[21] Appl. No.: 243,598

[22] Filed: Mar. 13, 1981

[30] Foreign Application Priority Data

Mar. 22, 1980 [JP] Japan .................................. 55-37698

[51] Int. Cl.$^3$ .............................................. H02P 5/16
[52] U.S. Cl. .................................. 318/341; 318/345 B
[58] Field of Search ............... 318/257, 268, 309–313, 318/326, 327, 329, 339, 341, 342, 345 R, 345 A, 345 B, 345 E, 345 F, 347

[56] References Cited

U.S. PATENT DOCUMENTS

| | | | |
|---|---|---|---|
| 3,586,948 | 6/1971 | Broome et al. | 318/341 |
| 3,596,162 | 7/1971 | Takayama | 318/341 |
| 3,617,847 | 11/1971 | Powell | 318/345 B |
| 3,936,711 | 2/1976 | Gay | 318/342 X |
| 4,210,851 | 7/1980 | Wakamiya | 318/257 |
| 4,236,102 | 11/1980 | Warmbier et al. | 318/329 X |

Primary Examiner—J. V. Truhe
Assistant Examiner—W. E. Duncanson, Jr.
Attorney, Agent, or Firm—Birch, Stewart, Kolasch & Birch

[57] ABSTRACT

A motor speed control system controls the rotation speed of the motor in accordance with the pulse width of a speed control pulse signal applied to the motor speed control system. The speed control pulse signal is not directly applied to the motor, but is converted to a voltage signal having a voltage level which corresponds to the pulse width of the speed control pulse signal. The converting system includes a charge/discharge circuit for varying a charge voltage level of a capacitor in accordance with the differences of the actual rotation speed of the motor and the desired rotation speed of the motor represented by the speed control pulse signal. The charge voltage level stored in the capacitor is applied to the motor to drive it.

5 Claims, 7 Drawing Figures

MOTOR SPEED CONTROL CIRCUIT

BACKGROUND AND SUMMARY OF THE INVENTION

The present invention relates to a motor speed control circuit and, more particularly, to a control circuit for controlling a motor speed in response to a pulse signal having a pulsewidth indicating a desired rotation speed.

A control system has been developed wherein a pulse signal is applied to a motor to control the rotation speed in accordance with a pulsewidth of the applied pulse signal. More specifically, a pulse controlled motor is developed, wherein the pulsewidth of the drive signal is lengthened when the rotation speed of the motor is slower than a desired value. In such a system, a large amount of energy is suddenly applied to the motor because the pulse shaped drive signal is applied directly to the motor. This drive method shortens an operation life of the motor because the intermittent drive deteriorates brushes and commutators included in the motor. Further, noises are inevitably developed and the bearing system must tolerate the rapid change of the rotation speed.

However, the pulsewidth control system is very effective because accurate control is achieved by a simple control circuit.

Accordingly, an object of the present invention is to provide a motor speed control circuit for ensuring a accurate control and a long motor life.

Another object of the present invention is to stabilize the pulsewidth control operation in a motor speed control system.

Still another object of the present invention is to provide a novel motor speed control system which enjoys the feature of the pulsewidth control system and minimizes the disadvantages held by the conventional pulsewidth motor speed control system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a conversion system is provided for converting a pulsewidth drive signal into a voltage signal indicative of a difference between the actual rotation speed and a desired rotation speed represented by the pulsewidth control signal. In a preferred form, the conversion system includes a charge discharge circuit having a capacitor in which the charge level is varied in response to the difference between the actual rotation speed of the motor and a desired rotation speed indicated by the pulsewidth control signal.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 2(A), 2(B) and 2(C) are time charts showing various signals occurring within the motor speed control system of FIG. 1, wherein FIG. 2(A) shows a constant operation mode, FIG. 2(B) shows an acceleration condition when the actual rotation speed is slower than a desired rotation speed, and FIG. 2(C) shows a deceleration condition when the actual rotation speed is faster than the desired rotation speed;

DESCRIPTION OF THE PREFERRED EMBODIMENTS

Figure 1:
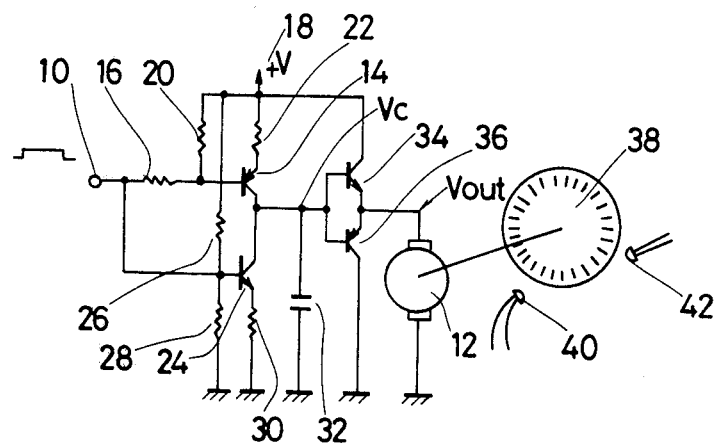
FIG. 1 is a circuit diagram of an embodiment of a motor speed control system of the present invention.

FIG. 1 shows an embodiment of a motor speed control system of the present invention. The motor speed control system of FIG. 1 comprises a speed control signal input terminal 10 to which a speed control pulse signal $V_{IN}$ is applied. The speed control pulse signal $V_{IN}$ bears a high level for a preselected period of time and T represents a desired speed of a motor 12. A base electrode of a charge control transistor 14 is connected to the speed control signal input terminal 10 via a resistor 16. The base electrode of the charge control transistor 14 is connected to a D.C. power source 18 via a resistor 20. The emitter electrode of the charge control transistor 14 is connected to the D.C. power source 18 through a resistor 22, and the collector electrode of the charge control transistor 14 is connected to a collector electrode of a discharge control transistor 24. The base electrode of the discharge control transistor 24 is connected to the speed control signal input terminal 10, and to the D.C. power source 18 via a resistor 26. The base electrode of the discharge control transistor 24 is further grounded through a resistor 28, and the emitter electrode of the discharge control transistor 24 is grounded via a resistor 30.

The commonly connected collector electrodes of the charge control transistor 14 and the discharge control transistor 24 are grounded via a capacitor 32, and further connected to commonly connected base electrodes of amplifying transistors 34 and 36. The collector electrode of the amplifying transistor 34 is connected to the D.C. power source 18, and the collector electrode of the amplifying transistor 36 is grounded. The emitter electrodes of the amplifying transistors 34 and 36 are commonly connected to each other, and further connected to the motor 12 to apply the drive voltage signal to the motor 12. A slit plate 38 is secured to the shaft of the motor 12 for providing a slit detection signal S in combination with a light emitting element 40 and a light responsive element 42 in response to the rotation of the motor 12.

As discussed above, the speed control pulse signal $V_{IN}$ is applied to the speed control signal input terminal 10. When the speed control signal $V_{IN}$ bears the low level, logic "0", the discharge control transistor 24 is OFF and the charge control transistor 14 is ON. A constant current circuit is formed by the charge control transistor 14, and the resistors 16, 20 and 22 to charge the capacitor 32 through the charge control transistor 14. Contrarily, when the speed control signal $V_{IN}$ bears the high level, logic "1", the charge control transistor 14 is OFF and the discharge control transistor 24 is ON. Accordingly, another constant current circuit is formed by the discharge control transistor 24 and resistors 26, 28 and 30 to discharge the capacitor 32 through the discharge control transistor 24. A charge voltage $V_C$ of the capacitor 32 is applied to an amplifying means comprising the amplifying transistors 34 and 36 to provide an output voltage signal $V_{OUT}$. The thus obtained output voltage signal $V_{OUT}$ is applied to the motor 12 to drive the motor 12. That is, the motor 12 receives the output voltage signal $V_{OUT}$ which corresponds to the charge level stored in the capacitor 32. The rotation speed of the motor 12 is monitored through the use of the slit detection signal S.

First, when the speed control pulse signal $V_{IN}$ bears the low level, logic "0", the capacitor 32 is charged. The motor 12 receives the drive voltage signal $V_{OUT}$ corresponding to the charge level stored in the capacitor 32. That is, the motor 12 begins to rotate, and the slit detection signal S is developed in response to the rotation of the motor 12. In response to the leading edge of the slit detection signal S, the speed control pulse signal $V_{IN}$ is changed to the high level, logic "1". Thereafter, the speed control pulse signal $V_{IN}$ bears the high level for a preselected period of time T. The pulse width T is selected at a period to satisfy the following relation.

$$T = \frac{b}{nN(a + b)} \quad (1)$$

where:
N is a desired rotation speed (revolution/sec) of the motor 12;
n is the number of slits formed in the slit plate 38;
a is a charge time constant of the capacitor 32; and
b is a discharge time constant of the capacitor 32.

During the time period T, the capacitor 32 is discharged. Thus, the output voltage signal $V_{OUT}$ gradually reduces. After passing the time period T, the speed control pulse signal $V_{IN}$ again bears the low level, logic "0".

The above-mentioned operation is repeated to control the rotation speed of the motor 12.

Figure 2:
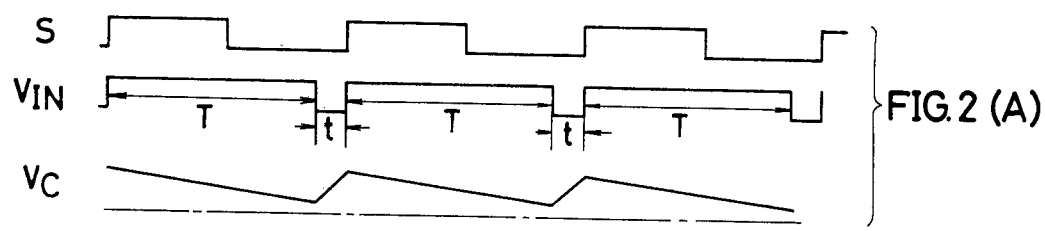
Figure 2:
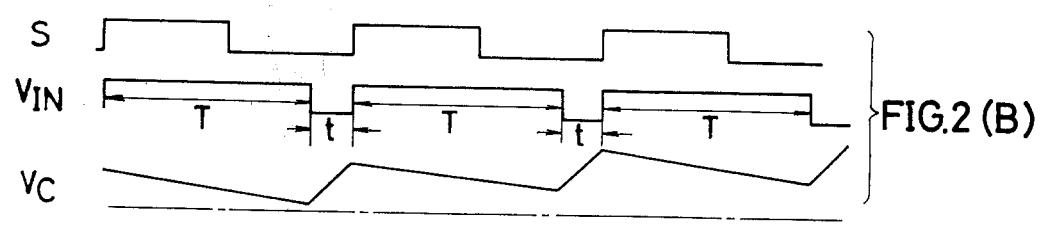
Figure 2:
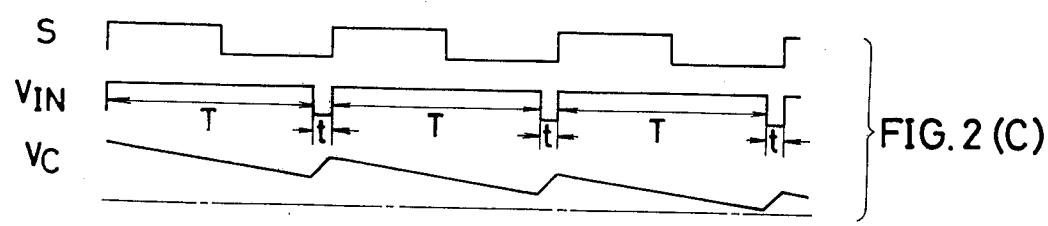

As shown in FIGS. 2(A), 2(B) and 2(C), the slit detection signal S has a frequency corresponding to the rotation speed of the motor 12. As already discussed above, the speed control pulse signal $V_{IN}$ bears the high level, logic "1", in response to the leading edge of the slit detection signal S. During the pulse width T of the speed control pulse $V_{IN}$, the capacitor 32 is discharged and, hence, the charge voltage $V_C$ gradually reduces. Thereafter, the speed control pulse signal $V_{IN}$ bears the low level, logic "0", for a period of time t. That is, the period t starts at the trailing edge of the speed control pulse signal $V_{IN}$ and ends at the leading edge of the next appearing slit detection signal S. During the period t, the capacitor 32 is charged to increase the charge voltage $V_C$. Accordingly, the charge voltage $V_C$ becomes higher when the period t becomes longer, and the charge voltage $V_C$ becomes lower when the period t becomes shorter. As already discussed above, the output voltage signal $V_{OUT}$ corresponds to the charge voltage $V_C$. FIG. 2(A) shows a condition where the motor 12 rotates at a desired constant speed.

When the rotation speed of the motor 12 becomes slower than the desired constant speed, the period of the slit detection signal S becomes longer. Since the pulse width T of the speed control pulse signal $V_{IN}$ is a fixed value determined in accordance with the equation (1), the period t becomes longer than the constant operation mode. Thus, the charge voltage $V_C$ increases to speed up the motor 12. The abovementioned acceleration condition is disclosed in FIG. 2(B).

Contrarily, when the rotation speed of the motor 12 becomes faster than the desired constant speed, the period of the slit detection signal S becomes shorter. Therefore, the charging period t becomes shorter to reduce the charge voltage $V_C$. In this way, the output voltage signal level is reduced to decelerate the motor 12. More specifically, the amplifying transistor 36 functions to absorb the counter electromotive force created by the motor 12, thereby braking the motor 12. FIG. 2(C) shows the above-mentioned decelerating condition.

In summary, in accordance with the present invention, the speed control pulse signal $V_{IN}$ is not directly applied to the motor 12. Instead thereof, a charge/discharge circuit is provided to vary the charge voltage level of the capacitor 32 in accordance with the differences between the actual rotation speed of the motor 12 and the desired constant speed. The voltage level of the output voltage signal $V_{OUT}$ varies in accordance with the variations of the charge voltage $V_C$ of the capacitor 32. Accordingly, the output voltage signal $V_{OUT}$ is smoothed. This is very effective in lengthening the operation at life time of the motor 12, stabilizing its operation and minimizing noises. It is preferable to select the discharge time constant b considerably longer than the charge time constant a, for example, a:b=5:95 in order to increase the loop gain.

Figure 3:
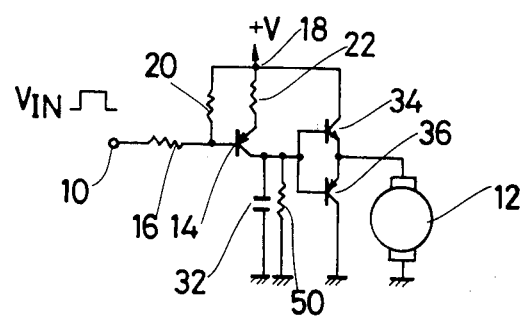
FIG. 3 is a circuit diagram of another embodiment of a motor speed control system of the present invention.

FIG. 3 shows another embodiment of the motor speed control system of the present invention. Like elements corresponding to those of FIG. 1 are indicated by like numerals.

In this embodiment, a resistor 50 is connected to the capacitor 32 in a parallel fashion, the resistor 50 functioning as the discharge path of the capacitor 32. That is, the constant current circuit including the discharge control transistor 24 and the resistors 26, 28 and 30 are omitted from the circuit construction. This embodiment works well because it requires the discharge time constant b to be considerably longer than the charge time constant a.

Figure 4:
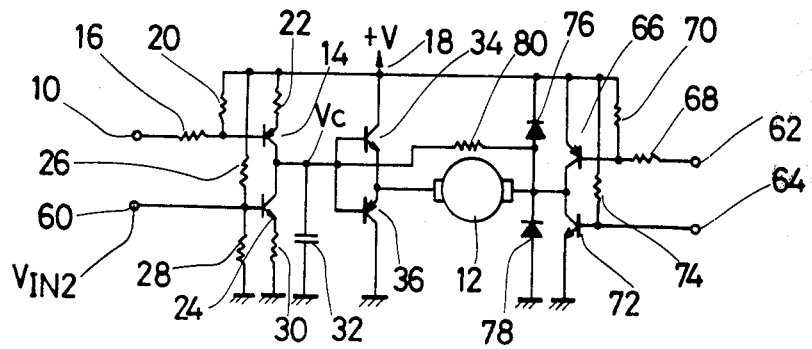
FIG. 4 is a circuit diagram of still another embodiment of a motor speed control system of the present invention.

FIG. 4 shows still another embodiment of the motor speed control system of the present invention, wherein the motor 12 is driven to rotate either forward or backward. Like elements corresponding to those of FIG. 1 are indicated by like numerals. The speed control signal input terminal 10 receives a forward speed control signal. Another speed control signal input terminal 60 is provided for receiving a backward speed control signal. Rotation direction control signal input terminals 62 and 64 are provided for instructing either the forward rotation or the backward rotation.

The speed control signal input terminal 10 is connected to the base electrode of the charge control transistor 14 via the resistor 16 as the embodiment of FIG. 1. The other speed control signal input terminal 60 is connected to the base electrode of the discharge control transistor 24. One terminal of the motor 12 is connected to the node provided between the emitter electrodes of the amplifying transistors 34 and 36 as in the case of the embodiment of FIG. 1. The rotation direction instruction signal input terminal 62 is connected to a base electrode of a transistor 66 via a resistor 68. The base electrode of the transistor 66 is connected to the D.C. power source 18 via a resistor 70. The emitter electrode of the transistor 66 is also connected to the D.C. power source 18. The rotation direction instruction signal input terminal 64 is connected to a base electrode of another transistor 72. The base electrode of the transistor 72 is connected to the D.C. power source 18 via a resistor 74, and the emitter electrode of the transistor 72 is grounded.

The collector electrodes of the transistors 66 and 72 are commonly connected with each other, and the node thereof is connected to the other terminal of the motor 12. A diode 76 is disposed between the node of the collector electrodes of the transistors 66 and 72 and the D.C. power source 18. Another diode is disposed between the node of the collector electrodes of the transistors 66 and 72 and the grounded terminal. Further, a resistor 80 is connected between the capacitor 32 and the other terminal of the motor 12.

When driving the motor 12 in the forward direction, a control signal $V_{IN2}=0$ is applied to the speed control signal input terminal 60, and $V_{IN3}=1$ and $V_{IN4}=1$ are applied to the rotation direction control signal input terminals 62 and 64, respectively. Then, the speed control signal $V_{IN1}$ is applied to the speed control signal input terminal 10 as in the case of the embodiment of FIG. 1. That is, in the forward rotation drive, the transistors 24 and 66 are OFF, and the transistor 72 is ON. Therefore, the circuit has the same construction as the embodiment of FIG. 3. Thus, the charge level of the capacitor 32 is controlled by the speed control pulse signal applied to the speed control signal input terminal 10. The discharge operation of the capacitor 32 is conducted through the resistor 80.

When driving the motor 12 in the reverse direction, $V_{IN1}=1$ is applied to the speed control signal input terminal 10. $V_{IN3}=0$ and $V_{IN4}=0$ are applied to the rotation direction control signal input terminals 62 and 64, respectively. The transistors 14 and 72 are OFF, and the transistor 66 is ON. Accordingly, an electric current flow is created through the transistor 66, the motor 12 and the transistor 36. Thus, the motor 12 is driven to rotate in the reverse direction in accordance with the speed control pulse signal $V_{IN2}$ applied to the speed control signal input terminal 60.

Figure 5:
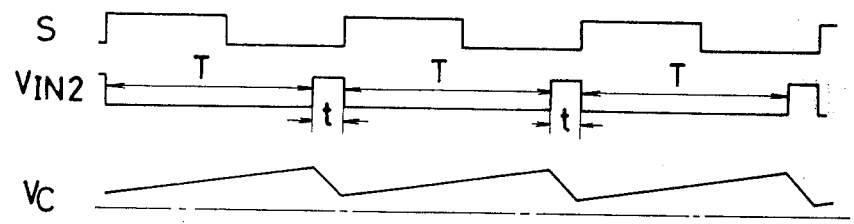
FIG. 5 is a time chart showing various signals occurring within the motor speed control system of FIG. 4.

FIG. 5 shows control signals occuring in the above-mentioned reverse direction drive. The speed control pulse signal $V_{IN2}$ bears the low level, logic "0",for a preselected period of time T. During the period of time T, the capacitor 32 is charged through the resistor 80. During the period of time t, the discharge control transistor 24 is ON to discharge the capacitor 32. The motor 12 receive the drive voltage signal in the reverse direction, of which voltage level corresponds to the charge voltage $V_C$ of the capacitor 32.

As already discussed above, the motor speed is controlled by comparing the pulse width T with the period of the slit detection signal S. Therefore, the motor speed is easily controlled by properly determining the pulse width T of the speed control pulse signal $V_{IN}$. More specifically, the motor speed is set at the desired rotation speed N (revolution/sec) through the use of the equation (1).

$$N = \frac{b}{nT(a+b)} \qquad (2)$$

When the discharge time constant b is considerably longer than the charge time constant a, the variation of the rotation speed N becomes small even when the time constants a and b vary. Thus, an accurate speed control is expected.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A motor speed control comprising:
    a motor;
    means for sensing the rotational speed of said motor;
    means responsive to said sensing means for developing a motor speed pulse signal including a series of pulses having a pulse width which varies in response to the sensed rotational speed of said motor;
    converting means responsive to said pulse signal produced by said developing means for developing a voltage signal having a voltage level corresponding to the pulse width of said series of pulses;
    drive means responsive to said voltage signal produced by said converting means for amplifying said voltage signal and driving said motor, said drive means including,
    first and second transistors having controlled terminals commonly connected together and to a first terminal of said motor, the bases of said transistors being commonly connected to said converting means to receive said voltage signal,
    said first transistor applying a drive voltage to said first terminal to drive said motor,
    said second transistor conducting to brake said motor by absorbtion of counter electromotive force when said voltage signal is at a level lower than the level indicative of the desired motor speed.

2. The motor speed control system of claim 1, said converting means comprising:
    a charge/discharge circuit including a capacitor; and switching means for selectively conducting either the charging operation or the discharging operation in accordance with said motor speed control pulse signal, the charge level of said capacitor being used to obtain said voltage signal.

3. The motor speed control system of claim 2, wherein the discharge time constant of said charge/discharge circuit is considerably longer than the charge time constant thereof.

4. The motor speed control system of claim 2 or 3, further comprising a resistor connected to said capacitor in a parallel fashion, said resistor functioning to form the discharge path of said capacitor.

5. The motor control of claim 1, comprising:
    direction control means for controlling the direction a motor rotation, said direction control means being operatively connected to a second terminal of said motor, said direction control means connecting the second terminal to ground to drive said motor in one direction and applying the supply voltage to said second terminal to drive said motor in the other direction.

* * * * *